(12) United States Patent
Liao et al.

(10) Patent No.: US 11,993,686 B2
(45) Date of Patent: May 28, 2024

(54) SURFACE TREATMENT METHOD OF A POLYMER FOR 5G

(71) Applicants: Beijing Normal University, Beijing (CN); Guangdong Guangxin Ion Beam Technology Co., Ltd., Guangdong (CN)

(72) Inventors: Bin Liao, Beijing (CN); Xiao Ouyang, Beijing (CN); Guoliang Wang, Beijing (CN); Xiaoping Ouyang, Beijing (CN); Jun Luo, Beijing (CN); Pan Pang, Beijing (CN); Lin Chen, Beijing (CN); Xu Zhang, Beijing (CN); Xianying Wu, Beijing (CN); Minju Ying, Beijing (CN)

(73) Assignees: Beijing Normal University, Beijing (CN); Guangdong Guangxin Ion Beam Technology Co., Ltd., Guangzhou (CN)

(*) Notice: Subject to any disclaimer, the term of this patent is extended or adjusted under 35 U.S.C. 154(b) by 854 days.

(21) Appl. No.: 16/933,116

(22) Filed: Jul. 20, 2020

(65) Prior Publication Data

US 2021/0332196 A1 Oct. 28, 2021

(30) Foreign Application Priority Data

Apr. 28, 2020 (CN) .......................... 202010350044.2

(51) Int. Cl.
*H01L 21/26* (2006.01)
*C08J 3/20* (2006.01)

(52) U.S. Cl.
CPC ............. *C08J 3/20* (2013.01); *C08J 2379/08* (2013.01)

(58) Field of Classification Search
CPC ........................... H01L 21/26; H01L 21/2633
See application file for complete search history.

(56) References Cited

U.S. PATENT DOCUMENTS

| | | | |
|---|---|---|---|
| 2006/0211126 A1* | 9/2006 | Banks | G01N 21/7703 422/82.11 |
| 2009/0101202 A1* | 4/2009 | Sun | H01L 31/1804 136/256 |
| 2012/0024044 A1* | 2/2012 | Tao | G01V 5/26 73/30.01 |
| 2014/0070701 A1* | 3/2014 | Schenkel | H01J 27/04 315/111.91 |

* cited by examiner

*Primary Examiner* — Thomas T Pham
(74) *Attorney, Agent, or Firm* — UB Greensfelder LLP; Richard C. Himelhoch

(57) ABSTRACT

The present application discloses a surface treatment method of a polymer for 5G, belonging to the technical field of surface treatment of polymer. By injecting and adding the oxygen elements to the polymer, the polymer matrix elements and the injected atoms can form a blend structure, which can increase the surface roughness of the polymer, improve its bonding strength with the metal, and thus enhance its anti-peel strength. The surface treatment method of the application has the surface resistivity, surface roughness, water absorption and tensile properties of the polymer all considered. The equipment used in the invention has long service life and low cost, and can realize large-scale roll-to-roll production. The method can be popularized in polymer surface treatment.

3 Claims, 5 Drawing Sheets

SURFACE TREATMENT METHOD OF A POLYMER FOR 5G

CROSS REFERENCE TO RELATED APPLICATION

This application claims the priority of Chinese Patent Application No. 202010350044.2, entitled "Surface treatment method of a polymer for 5G" filed with the Chinese Patent Office on Apr. 28, 2020, which is incorporated herein by reference in its entirety.

TECHNICAL FIELD

The present application belongs to the technical field of surface treatment of a polymer, especially relating to a surface treatment method of a polymer for 5G.

BACKGROUND ART

With the development of science and technology, polymer has been widely used in the technical field, and its importance has become increasingly prominent. The polymer itself has very unique properties, such as excellent corrosion resistance, high and low temperature resistance, aging resistance, physical and chemical inertness, high insulation and so on. However, in most cases, the polymer itself is not used alone. It needs to be coupled with other metals, non-metals, metal oxides, etc. Therefore, higher requirements are put forward for the bonding performance of the polymer surface, especially for some applications requiring high bonding interface strength. It is difficult for conventional polymers to meet the bonding requirements, which greatly limits the further wide application of polymers.

There are two kinds of traditional polymer surface treatment methods. One is chemical treatment method, by corroding the surface of a polymer through alkali, thus obtaining coarsening surface of the polymer. Another is corona treatment. Corona discharge means a corona discharge with no spark happens when static voltage reaches a certain value. This effect functions in two ways: 1) electrostatic eliminating: under the action of electrostatic field, the surrounding air is ionized, and thus forming positive and negative ions, one of which carry ions in contrast to the fabric, the other carry ions in contrast to environment or the earth, thus eliminating electrostatic by neutralization; 2) the polymer surface is slightly etched, generating ions, electrons and free radicals during corona treatment. The corona discharge can be carried out in atmospheric atmosphere, belonging to a manner of mild surface treatment because of the weak energy, and the surface treatment mechanism is not yet clear.

Therefore, the existing methods for surface treatment have disadvantages of: low energy, which is not enough to make the surface key break; small corona discharge current, leading to high cost, low efficiency and limited effect, especially for some special polymers, such as PI, LCP, MPI, PET or PTFE. Because of the low energy and strong surface inert of the polymer surface, high-energy ion is needed to break the chemical bond. In corona treatment, the particle energy is only a few eV, which is not enough to improve the surface energy, thus unable to improve the bonding strength between the polymer and metal or non-metal.

SUMMARY OF THE INVENTION

The purpose of the present application is to provide a surface treatment method of a polymer for 5G, in which the treated polymer has high surface energy and bonding strength with metal or non-metal.

For the purpose of the application, the application provides the following technical schemes.

The present application provides a surface treatment method of a polymer for 5G, comprising the steps of:

S1. using a Penning ion source to proceed oxygen insertion on the surface of a polymer, controlling the roughness of the polymer surface to change less than or equal to 0.1 μm, obtaining a first polymer;

S2. using a Kaufman ion source to proceed oxygen addition on the surface of the first polymer, controlling the roughness of the first polymer surface to change less than or equal to 0.1 μm, obtaining a second polymer;

S3. using a Hall ion source to proceed hydrogen abstraction on the surface of the second polymer, obtaining a third polymer;

S4. when the surface roughness of the third polymer is greater than 0.4 μm or less than 0.1 μm, repeating S1~S3 until the surface roughness of the third polymer is 0.1~0.4 μm.

Preferably, the polymer described in S1 includes polyimide, liquid crystalline polymer, modified polyimide, polyethylene terephthalate and polytetrafluoroethylene.

Preferably, the oxygen insertion described in S1 has an oxygen flow ranging from 5 sccm to 80 sccm, a voltage ranging from 20 KV to 40 KV, and a beam intensity ranging from 1 mA to 50 mA.

Preferably, the oxygen addition described in S2 has an oxygen flow ranging from 20 sccm to 100 sccm, a voltage ranging from 10 KV to 20 KV, and a beam intensity ranging from 5 mA to 150 mA.

Preferably, the hydrogen abstraction has an argon flow ranging from 50 sccm to 150 sccm, a voltage ranging from 0.1 KV to 1 KV, and a beam intensity ranging from 200 mA to 1000 mA.

Preferably, when the second polymer has a surface resistance greater than $10^{15}\Omega$, returning to S1, until the surface resistance is less than or equal to $10^{15}\Omega$.

Preferably, the polymer after the surface treatment has a dielectric constant greater than 3.0, a surface water absorption greater than 10%, a surface resistance greater than $10^{14}\Omega$, a surface roughness ranging from 0.1 μm to 0.4 μm, a hydrophilic contact angle ranging from 40° to 80°, a 5 GHz high frequency dielectric loss equal to or less than 0.004.

The present application provides a surface treatment method of a polymer for 5G, comprising the steps of: S1. using a Penning ion source to proceed oxygen insertion on the surface of a polymer, controlling the roughness of the polymer surface to change less than or equal to 0.1 μm, obtaining a first polymer; S2. using a Kaufman ion source to proceed oxygen addition on the surface of the first polymer, controlling the roughness of the first polymer surface to change less than or equal to 0.1 μm, obtaining a second polymer; S3. using a Hall ion source to proceed hydrogen abstraction on the surface of the second polymer, obtaining a third polymer; S4. when the surface roughness of the third polymer is greater than 0.4 μm or less than 0.1 μm, repeating S1~S3 until the surface roughness of the third polymer is 0.1~0.4 μm. Chemical broken bonds and dangling bonds are formed through high-energy particle oxygen insertion, C—O bond, C=O bond and so on are formed through oxygen addition, all of which belong to high hydrophilic group with high surface energy. At the same time, oxygen insertion and addition can eliminate the inert bonds, such as the C—F bond. In addition, the Penning ion source and Kaufman ion source, both of which belong to high-energy sputtering, can form a surface area with a certain roughness, thus increasing the surface area and greatly increasing the overall surface energy of the polymer.

By injecting and adding the oxygen elements to the polymer, the polymer matrix elements and the injected atoms can form a blend structure, which can increase the surface roughness of the polymer, improve bonding strength thereof with the metal, and thus enhance anti-peel strength thereof.

The surface treatment method based on a gas ion source has strong operability in cleaning, and the polymer has good physical and chemical stability after treatment. It can be directly swabbed or washed with a wet towel with a neutral detergent, and the physical and chemical properties of the polymer itself will not be affected after washing.

The surface treatment method of the application has the surface resistivity, surface roughness, water absorption and tensile properties of the polymer simultaneously taken into account. The equipment used in the application has long service life and low cost, and can realize large-scale roll-to-roll production. The method can be popularized in polymer surface treatment.

DETAILED DESCRIPTION OF THE EMBODIMENTS

Figure 1:
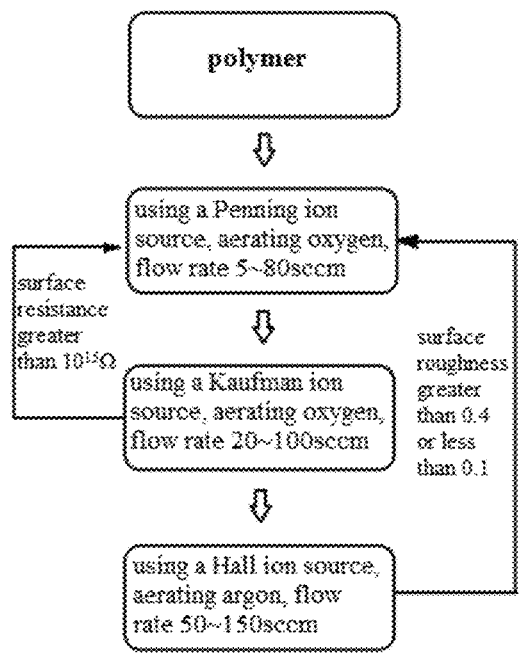
FIG. 1 is a flow chart of the method of an embodiment.

The present application provides a surface treatment method of a polymer for 5G, comprising the steps of:

S1. a Penning ion source is used to proceed oxygen insertion on the surface of a polymer, the roughness of the polymer surface is controlled to change less than or equal to 0.1 µm, and a first polymer is obtained;

S2. a Kaufman ion source is used to proceed oxygen addition on the surface of the first polymer, the roughness of the first polymer surface is controlled to change less than or equal to 0.1 µm, and a second polymer is obtained;

S3. a Hall ion source is used to proceed hydrogen abstraction on the surface of the second polymer, and a third polymer is obtained;

S4. S1~S3 are repeated when the surface roughness of the third polymer is greater than 0.4 µm or less than 0.1 µm until the surface roughness of the third polymer is 0.1~0.4 µm.

In the present application, unless otherwise specified, the required equipments or polymers are well known and commercial available to those skilled in the art.

The Penning ion source is used to proceed oxygen insertion on the surface of the polymer, and the roughness of the polymer surface is controlled to change less than or equal to 0.1 µm, resulting with a first polymer. In the embodiments, the polymers preferably include polyimide (PI), liquid crystalline polymer (LCP), modified polyimide (MPI), polyethylene terephthalate (PET) and polytetrafluoroethylene (PTFE). In the embodiments, the oxygen flow rate of oxygen insertion preferably ranges from 5 to 80 sccm, more preferably 10 to 60 sccm, and further preferably 30 to 50 sccm; the voltage preferably ranges from 20 to 40 KV, and more preferably 25 to 35 KV; the beam intensity preferably ranges from 1 to 50 mA, more preferably 10 to 40 mA, and further preferably 20 to 30 mA. The embodiments realize the oxygen insertion on the surface of the polymer through a Penning ion source, and facilitate the combination of O and H because of the high oxygen ion energy, thus forming OH radical.

After the first polymer is obtained, the Kaufman ion source is used to proceed oxygen addition on the surface of the first polymer, and the roughness of the first polymer surface is controlled to change less than or equal to 0.1 µm, resulting with a second polymer. In the embodiments, the oxygen flow rate of oxygen addition preferably ranges from 20 to 100 sccm, more preferably 40 to 80 sccm, and further preferably 50 to 60 sccm; the voltage preferably ranges from 10 to 20 KV, and more preferably 12 to 15 KV; the beam intensity preferably ranges from 5 to 150 mA, more preferably 20 to 120 mA, and further preferably 50 to 100 mA. In an embodiment, when the second polymer has a surface resistance greater than $10^{15}\Omega$, preferably returning to S1, until the surface resistance is less than or equal to $10^{15}\Omega$. The embodiments realize: the oxygen addition on the surface of the first polymer through the Kaufman ion source; forming of C—O bond by the combination of oxygen with carbon on the surface of the first polymer, facilitating the increase of surface energy; Penning ion source treatment (oxygen insertion) is repeated when the surface resistance is greater than $10^{15}\Omega$. The higher resistance means less C—O key, OH radical and carbon, which can affect the surface hydrophilicity of the polymer.

After the second polymer is obtained, the Hall ion source is used to proceed hydrogen abstraction on the surface of the second polymer, resulting with a third polymer. In the embodiments, the argon flow rate of hydrogen abstraction preferably ranges from 50 to 150 sccm, more preferably 60 to 120 sccm, and further preferably 80 to 100 sccm; the voltage preferably ranges from 0.1 to 1 KV, more preferably 0.3 to 0.8 KV, and further preferably 0.5 to 0.6 KV; the beam intensity preferably ranges from 200 to 1000 mA, more preferably 400 to 800 mA, and further preferably 500 to 600 mA. The embodiments realize the hydrogen abstraction on the surface of the second polymer through the Hall ion source, and realizes at the same time the roughness ranging from 0.1 µm to 0.4 µm. In the embodiments, the Ar ions, used in the Hall ion source, are used for hydrogen abstraction and surface micro-etching. The micro-etching nano-structure has a hydrophilic structure with large specific surface area, which can significantly improve the surface energy of the polymer.

In the embodiments, when the surface roughness of the third polymer is greater than 0.4 µm or less than 0.1 µm, S1~S3 are repeated until the surface roughness of the third polymer is 0.1~0.4 µm. If the surface roughness is too small, it means low surface energy and poor hydrophilic, so the combination of high bonding strength cannot be achieved; if the surface roughness is too large, the high frequency loss is large during transmission, so the application of 5G communication cannot be realized. By repeating the Penning ion source-Kaufman ion source-Hall ion source process, a polymer with surface roughness Ra0.1~0.4 μm is obtained, which has a strong bonding strength with metal. The surface energy of the polymer is proportional to the roughness. The larger the surface roughness is, the larger the surface area of the polymer matrix material is, so that the surface energy of the polymer matrix material is higher, and the bonding strength with other materials is better. On the contrary, the bonding strength is poor. Due to the skin effect, high frequency loss happens easily for the substrate material with high roughness. The embodiments have both the roughness and the bonding strength considered, and realize the regulation of the polymer on high-energy transmission signal loss by controlling the roughness of polymer matrix surface.

In the embodiments, the principles of oxygen insertion, oxygen addition and hydrogen abstraction are as follows:

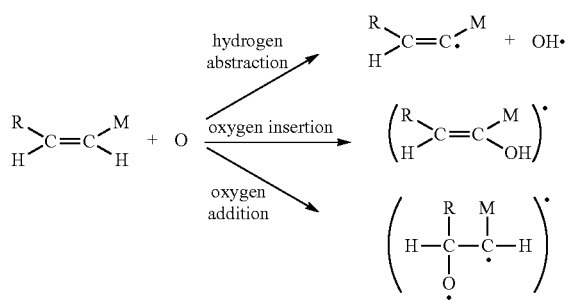

In the embodiments, the polymer after the surface treatment has a dielectric constant greater than 3.0, a surface water absorption greater than 10%, a surface resistance greater than $10^{14}Ω$, a surface roughness ranging from 0.1 μm to 0.4 μm, a hydrophilic contact angle ranging from 40° to 80°, and a 5 GHz high frequency dielectric loss equal to or less than 0.004. The Hall ion source treatment in S3 has a large beam current, which implements etching easily. The large beam current has an influence on the surface roughness of the polymer, and leads to a fever, thus influencing the oxygen insertion and oxygen addition. By controlling the parameters in S1~S3, the polymer realizes the self-healing, and has excellent surface properties.

FIG. 1 is the flow chart of the surface treatment method of the polymer used for 5G of an embodiment. As shown in the FIG. 1, firstly the oxygen insertion is carried out on the surface of the polymer by using a Penning ion source, so that the roughness change of the polymer surface is ≤0.1 μm, and a first polymer is obtained. Then, the Kaufman ion source is used to add oxygen to the surface of the first polymer, so that the roughness change of the surface of the first polymer is less than or equal to 0.1 μm, and a second polymer is obtained. When the surface resistance of the second polymer is higher than $10^{15}Ω$, preferably go back to oxygen insertion step, until the surface resistance of the second polymer ≤$10^{15}Ω$; Finally, a third polymer is obtained by hydrogen abstraction on the surface of the second polymer using Hall ion source. When the surface roughness of the third polymer is greater than 0.4 μm or less than 0.1 μm, S1~S3 are repeated until the roughness of the polymer surface is 0.1~0.4 μm.

The technical scheme of the application will be described clearly and completely in combination with the embodiments in the application. Obviously, the embodiments described are only part of the embodiments of the application, not all of them. Based on the embodiments in the application, all other embodiments obtained by ordinary technicians in the field without creative labor shall be covered by the protection of the application.

Example 1

S1. The oxygen insertion on the surface of the MPI matrix was carried out by using the Penning ion source. The voltage was 30 KV, the oxygen flow was 60 sccm, and the beam intensity was 25 mA, so that the roughness changes of the polymer surface was less than or equal to 0.1 μm, and a first polymer was obtained;

S2. The oxygen addition on the surface of the first polymer was carried out by using the Kaufman ion source. The voltage was 15 KV, the oxygen flow was 50 sccm, and the beam intensity was 150 mA, so that the roughness changes of the polymer surface was less than or equal to 0.1 μm, and a second polymer was obtained. The surface resistance of the second polymer was $2×10^{15}Ω$, and thus returning to S1 to proceed oxygen insertion and oxygen addition in order, until the resistance of the second polymer was less than $10^{15}Ω$;

S3. The hydrogen abstraction was carried out on the surface of the second polymer by using the Hall ion source. The voltage was 800V, the gas flow was 100 sccm, the beam intensity was 800 mA, and a third polymer was obtained. The surface roughness of the third polymer is 0.5 μm, and thus repeating S1~S3, until the roughness of the polymer treated was in a range from 0.1 μm to 0.4 μm. The roughness of the polymer in this embodiment was 0.3 μm after the treatment.

Example 2

S1. The oxygen insertion on the surface of the MPI matrix was carried out by using the Penning ion source. The voltage was 20 KV, the oxygen flow was 60 sccm, and the beam intensity was 25 mA, so that the roughness changes of the polymer surface was less than or equal to 0.1 μm, and a first polymer was obtained;

S2. The oxygen addition on the surface of the first polymer was carried out by using the Kaufman ion source, the voltage was 10 KV, the oxygen flow was 50 sccm, and the beam intensity was 100 mA, so that the roughness changes of the polymer surface was less than or equal to 0.1 μm, and a second polymer was obtained. The surface resistance of the second polymer was $2×10^{15}Ω$, and thus returning to S1 to proceed oxygen insertion and oxygen addition in order, until the resistance of the second polymer was less than $10^{15}Ω$;

S3. The hydrogen abstraction on the surface of the second polymer was carried out by using the Hall ion source. The voltage was 500V, the gas flow was 110 sccm, and the beam intensity was 800 mA, and a third polymer was obtained. The surface roughness of the third polymer was 0.5 μm, and thus repeating S1~S3, until the roughness of the polymer treated was in a range from 0.1 μm to 0.4 μm. The roughness of the polymer in this embodiment was 0.2 μm after the treatment.

Performance Test and Verification

Figure 2:
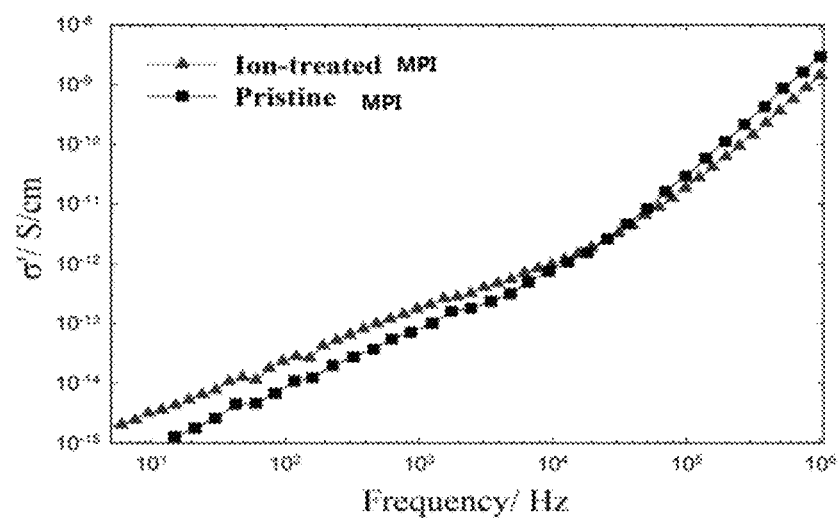
FIG. 2 is an impedance test diagram of ion-treated MPI and pristine MPI in Example 1.
Figure 3:
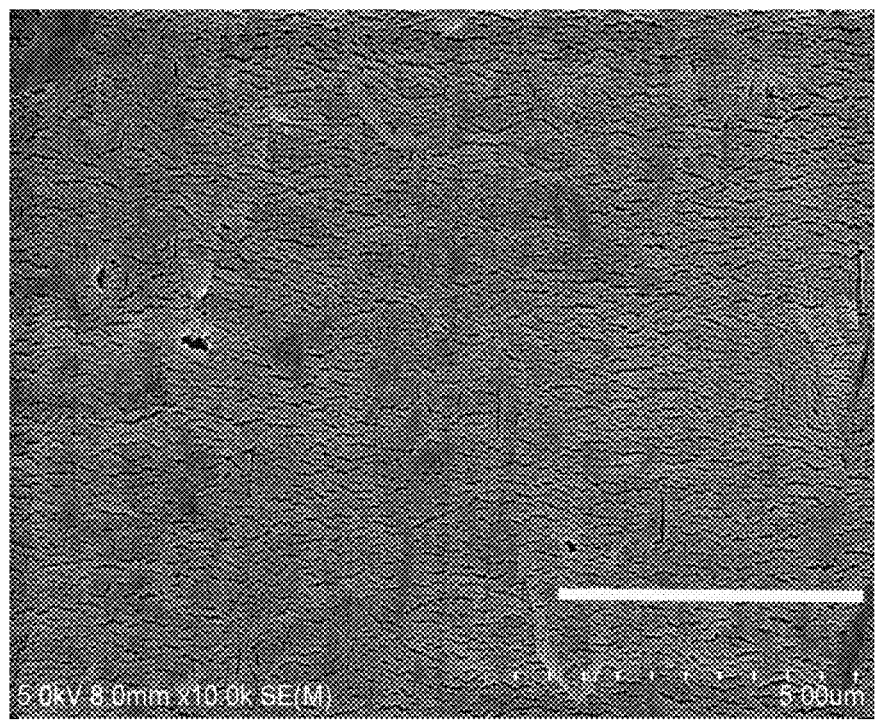
FIG. 3 is a SEM diagram of the polymer in Example 1 before treatment.
Figure 4:
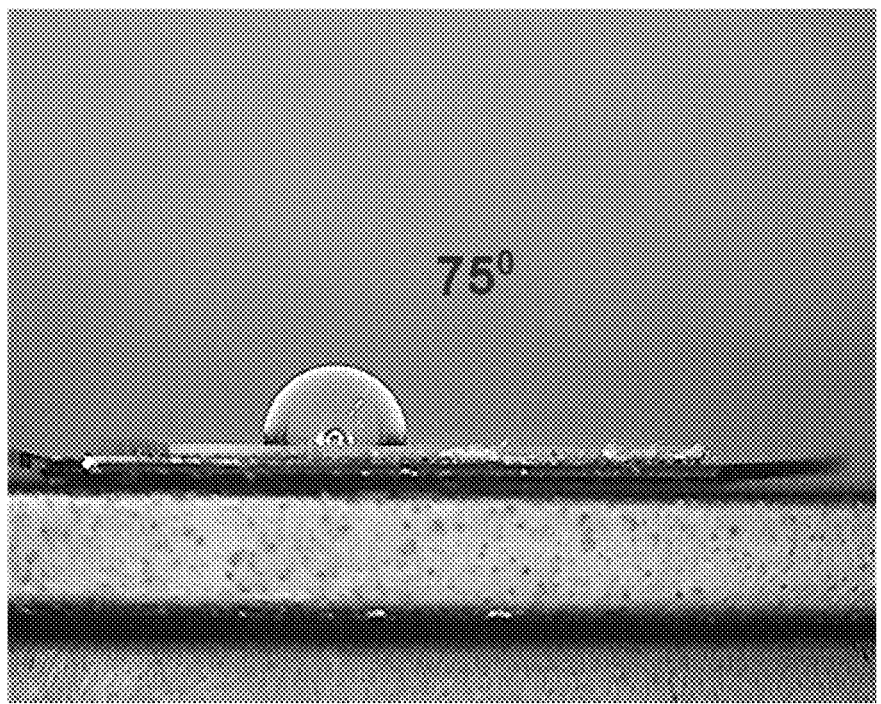
FIG. 4 is a surface hydrophilic angle diagram of the polymer in Example 1 before treatment.
Figure 5:
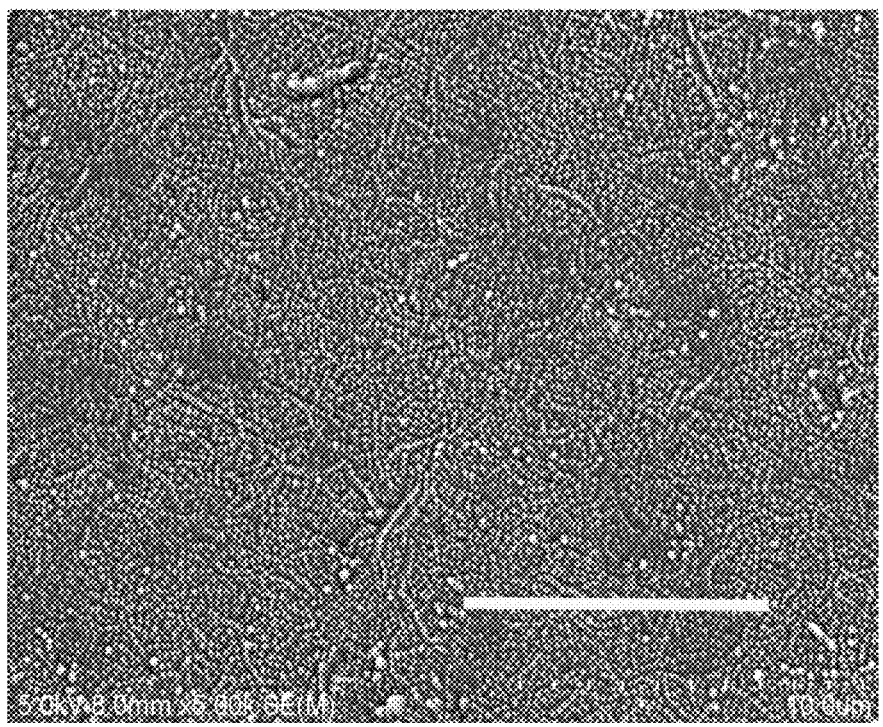
FIG. 5 is a SEM diagram of the polymer in Example 1 after treatment.
Figure 6:
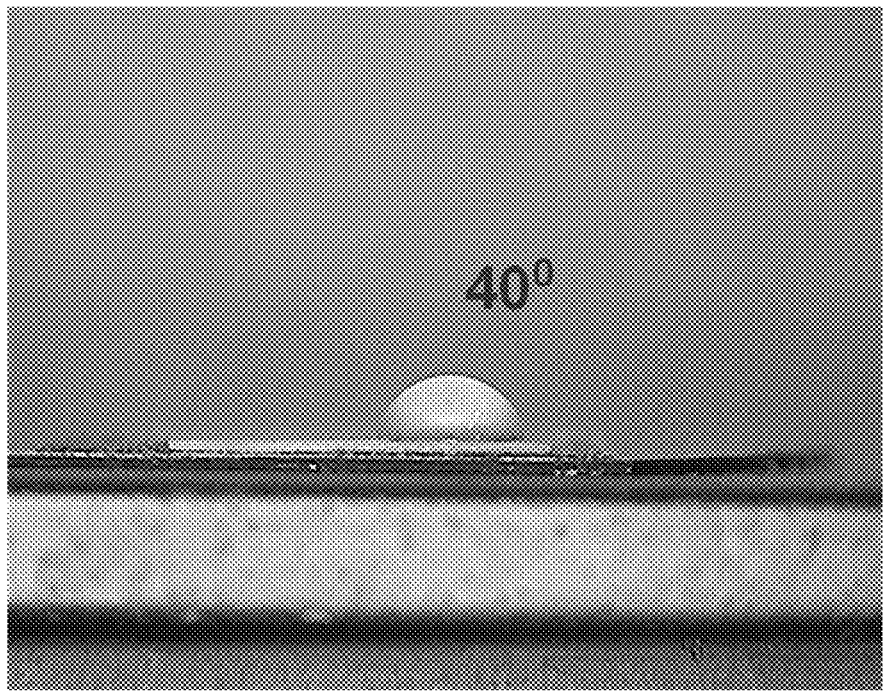
FIG. 6 is a surface hydrophilic angle diagram of the polymer in Example 1 after treatment.

1) Impedance test (15 KV) was performed on pristine MPI and the treated MPI in Example 1. The results were shown in FIG. 2. It can be seen from the FIG. 2 that the impedances of MPI polymer before and after treatment are basically the same at $10^6$ high frequency, indicating that ion implantation has no effect on the electrical properties of the substrate material itself.

2) The surface hydrophilic angle and the surface morphology of the polymer before and after the treatment of Example 1 were tested, and the results were shown in FIGS. 3~6. As can be seen from FIGS. 3-6, the hydrophilicity of the treated polymer surface is significantly enhanced, and the hydrophilic angle changes from 75° to 40°, with a significant decrease and a significant treatment effect. After the treatment, the roughness of the polymer surface increases from 0.12 μm to 0.23 μm.

Figure 7:
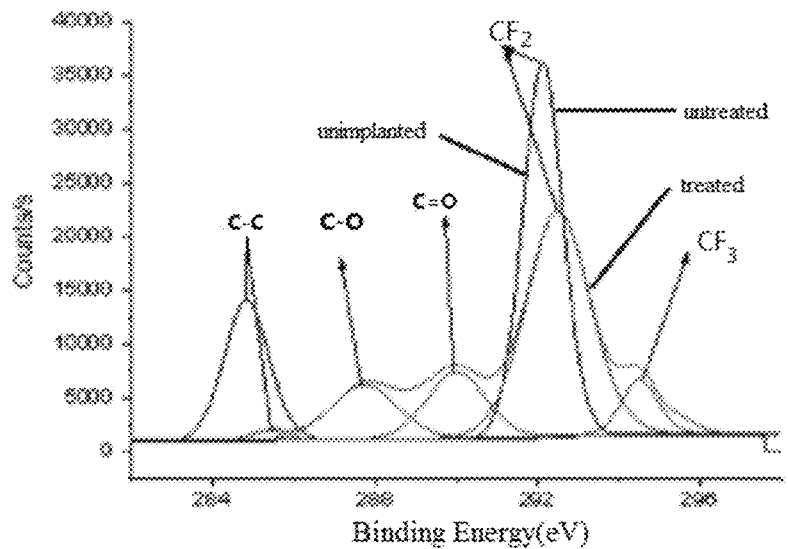
FIG. 7 is a surface XPS diagram of the polymer in Example 1 after treatment.

3) The polymer surface treated and untreated of Example 1 were characterized by XPS, and the results were shown in FIG. 7. As can be seen from FIG. 7, the C—F bond on the surface of the polymer untreated is dominating obviously, and the treated polymer is divided into two peaks. It can be seen that the number of C—O bond and C=O bond on the surface of the polymer treated increase significantly, and the appearance of C—O single bond and C=O double bond are able to significantly increase the surface energy and hydrophilic properties of the polymer.

Figure 8:
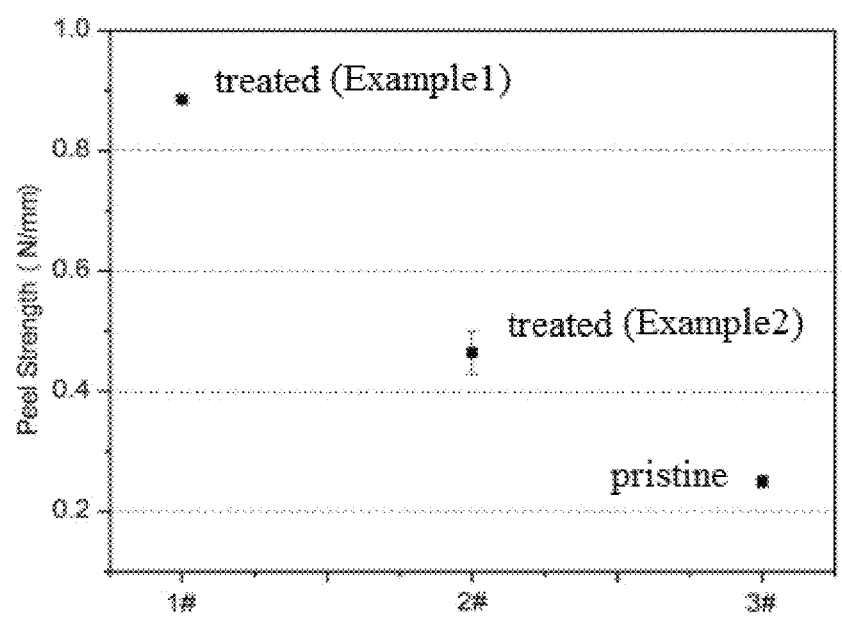
FIG. 8 is a binding force test diagram of the pristine polymer and the polymers after treatment in Examples 1~2.

4) The pristine MPI and the treated polymer in Examples 1~2 were tested for binding force, and the results were shown in FIG. 8.

Figure 9:
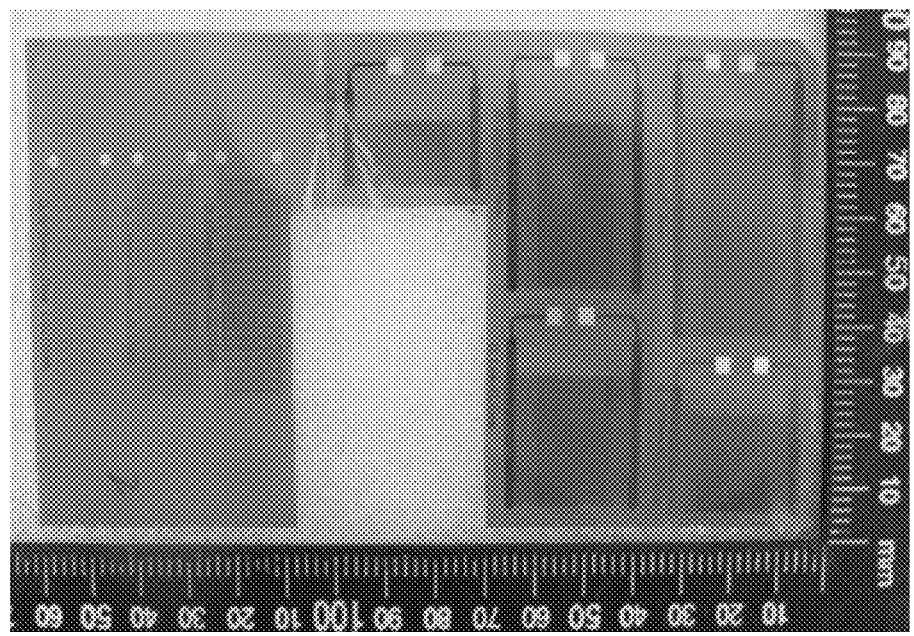
FIG. 9 is a schematic diagram of a polymer combining with copper film.

The test method was as follows: the pristine polymer and the treated polymer in Examples 1~2, respectively, was attached to the surface of the copper film by compression method (as shown in FIG. 9), and the binding force was tested.

As can be seen from FIG. 8, the binding strength between the treated polymer and the copper film increases significantly, up to 0.9 KG/cm, and the surface treatment effect is obvious.

The above described are only preferred embodiments of the present application, It should be understood by those skilled in the art that, without departing from the principle of the present application, any variations and modifications fall into the scope of the present application.

What is claimed is:

1. A surface treatment method of a polymer for 5G, comprising the steps of:

S1. proceed oxygen insertion by using a Penning ion source on the surface of the polymer, controlling a roughness of the polymer surface to change greater than 0 μm and less than or equal to 0.1 μm, obtaining a first polymer;

S2. proceed oxygen addition by using a Kaufman ion source on a surface of the first polymer, controlling a roughness of the first polymer surface to change greater than 0 μm and less than or equal to 0.1 μm, obtaining a second polymer;

S3. repeat steps S1 and S2 until the surface resistance of the second polymer is less than or equal to $10^{15}\Omega$;

S4. proceed hydrogen abstraction by using a Hall ion source on the surface of the second polymer, obtaining a third polymer;

S5. repeat steps S1-S4 until the surface roughness of the third polymer is 0.1~0.4 μm; wherein the oxygen insertion in S1 has an oxygen flow ranging from 5 sccm to 80 sccm, a voltage ranging from 20 kV to 40 kV, and a beam intensity ranging from 1 mA to 50 mA, the oxygen addition in S2 has an oxygen flow ranging from 20 sccm to 100 sccm, a voltage ranging from 10 kV to 20 kV, and a beam intensity ranging from 5 mA to 150 mA, and the hydrogen abstraction has an argon flow ranging from 50 sccm to 150 sccm, a voltage ranging from 0.1 kV to 1 kV, and a beam intensity ranging from 200 mA to 1000 mA.

2. The surface treatment method according to claim 1, wherein the polymer in S1 is selected from polyimide, liquid crystalline polymer, modified polyimide, polyethylene terephthalate and polytetrafluoroethylene.

3. The surface treatment method according to claim 1, wherein the polymer after the surface treatment has a dielectric constant greater than 3.0, a surface water absorption greater than 10%, a surface resistance greater than 1014Ω, a surface roughness ranging from 0.1 μm to 0.4 μm, a hydrophilic contact angle ranging from 40° to 80°, a 5 GHz high frequency dielectric loss equal to or less than 0.004.

\* \* \* \* \*